United States Patent [19]
Harford

[11] 3,835,248
[45] Sept. 10, 1974

[54] KEYED AGC CIRCUIT

[75] Inventor: Jack Rudolph Harford, Flemington, N.J.

[73] Assignee: RCA Corporation, New York, N.Y.

[22] Filed: Mar. 5, 1973

[21] Appl. No.: 338,109

[52] U.S. Cl. .......................... 178/7.3 R, 178/7.5 DC
[51] Int. Cl. ............................................ H04n 5/52
[58] Field of Search...... 178/7.3 DC, 7.3 R, 7.5 DC, 178/7.5 R

[56] References Cited

UNITED STATES PATENTS

| | | | |
|---|---|---|---|
| 3,457,366 | 7/1969 | Kent et al. | 178/7.5 DC |
| 3,624,290 | 11/1971 | Hofmann | 178/7.3 DC |

*Primary Examiner*—Robert L. Griffin
*Assistant Examiner*—George G. Stellar
*Attorney, Agent, or Firm*—E. M. Whitacre; M. DeCamillis

[57] ABSTRACT

A keyed automatic gain control (AGC) circuit for a television receiver rapidly responds to changes in the level of a received television signal by using a sample and hold arrangement wherein the time for sampling the amplitude of the synchronizing pulses is less than the shortest pulse width of any of the synchronizing pulses of the television signal. The value of an AGC current supplied by the AGC circuit is dependent upon the amplitude and polarity of the synchronizing pulse components with respect to a reference level and is substantially independent of the width of the synchronizing pulse components.

Included in the circuit are means for providing impulse noise protection both when the flyback and synchronizing pulses are in time coincidence and when they are not in time coincidence. Furthermore, a non-keyed component of AGC current is provided to prevent sync stripping during non-synchronized operation.

19 Claims, 5 Drawing Figures

KEYED AGC CIRCUIT

BACKGROUND OF THE INVENTION

This invention relates to automatic gain control (AGC) circuits and more particularly to keyed AGC circuits for television. AGC circuits embodying the invention are particularly suitable for fabrication using integrated circuit techniques.

As used herein, the term integrated circuit refers to a unitary or monolithic semiconductor device or chip which is the equivalent of a network of interconnected active and passive circuit elements.

AGC circuits are commonly used in television receivers to derive a suitable control voltage for application to the radio frequency (RF) and intermediate frequency (IF) amplifier stages of the receiver. The control voltage is effective to vary the gain of the stages inversely in accordance with the level of the synchronizing pulse components of a detected video signal so as to provide a constant peak amplitude of the detected video output signal. The synchronizing pulse components of the video signal are thereafter separated and used for synchronizing the horizontal and vertical oscillators associated with the respective horizontal and vertical sweep circuits of the receiver.

It is customary in television receivers to derive the AGC signal by sampling the peak level of the synchronizing pulse components during the horizontal (line) scanning retrace interval. A peak detector is utilized, but because it is quite susceptible to impulse noise, means are provided to gate the AGC circuit on only during the relatively short horizontal retrace (flyback) pulses so that impulse noise occurring in the video signals during the remainder of the line scanning period cannot affect the operation of the AGC circuit.

The peak detector includes a capacitor across which the AGC potential is developed. Some prior art AGC systems have employed a rather long AGC time constant in order to reduce any pulse width effects. However, the time required for the AGC circuit to respond to changes in the level of the received television signal is undesirably long in such systems.

It is desirable that the AGC circuit respond rapidly in order to follow fading caused, for example, by signal reflections from passing airplanes, and to follow changes in the level of the received television signal when the tuned channel is changed from a strong incoming signal to a weak incoming signal and vice versa. Since an airplane passing overhead may cause level changes at frequencies on the order of several hundred cycles per second, a slower response time may result in picture fading or flutter. Some prior attempts to improve performance employed, for example, a pulse differentiating circuit to provide a relatively constant amplitude pulse of short duration which represented the magnitude of the excursion of the sync pulse beyond a reference level. Such a differentiating technique tends to cause high peak currents for a given speed of response which put severe requirements on the AGC capacitor being used. Furthermore, high peak AGC currents may create a ripple in the video, sometimes called a "glitch"—a momentary reduction in the gain resulting in the distortion of sync information during the AGC keying pulse interval.

Another reason for increasing the AGC circuit response is to eliminate vertical depression. Vertical depression appears when the AGC loop gain undergoes wide variations during the vertical blanking interval. These wide variations are caused by the different pulse widths of the vertical and equalizing pulses. Typically, AGC systems employ filtering of the video signal for enhanced impulse noise and thermal noise performance and the first 1–2 microseconds of each synchronizing pulse are discriminated against. Thus, normal horizontal sync pulses of 5 microseconds duration have only about 3 microseconds of time in which to replenish the charge lost from the AGC filter capacitor during the previous 63 microsecond line scanning and retrace portion of the signal. The equalizing pulses (about 2 ½ microseconds long) only contribute about one microsecond of charging time while the relatively long vertical pulses contribute about 15 microseconds of charging time (the full horizontal keying time). Thus, the ACG loop gain varies by a factor of about 15 just due to the different pulse widths. Because of the transient response of the system, this loop gain variation can cause the AGC voltage to overshoot and produce a voltage depression during the vertical blanking period. This vertical depression can cause faulty vertical sync information which results in poor interlace and vertical jitter.

SUMMARY OF THE INVENTION

In accordance with one aspect of the present invention, an automatic gain control circuit of the type responsive to synchronizing signal components comprising pulses of different time duration, the combination including, a source of recurring pulses in time coincidence with the synchronizing pulses. The recurring pulses have a longer time duration than the shortest duration ones of the synchronizing signal pulses. Means for supplying the composite video signal including synchronizing signal pulses and an amplitude sensitive circuit means are also included. The amplitude sensitive circuit means is responsive to the video signals for maintaining a first conductive condition for video signals of a first polarity with respect for a threshold level and for translating video signal excursions of opposite polarity with respect with the threshold level. A peak detector circuit is coupled to the amplitude sensitive circuit means for detecting the translated video signal excursions, the peak detector exhibiting a time constant suitable for peak detecting each of the synchronizing signal pulses of different duration. Keying means is coupled to the source of recurrent pulses and to the peak detector circuit for providing, during the occurrence of recurring pulses, a variable current determined by the amplitude of the detector signal developed by the peak detector circuit. Also included is an output signal circuit means that is coupled to the keying means for developing an automatic gain control voltage determined by the variable current developed by the keying means.

DETAILED DESCRIPTION OF THE DRAWINGS

Figure 1:
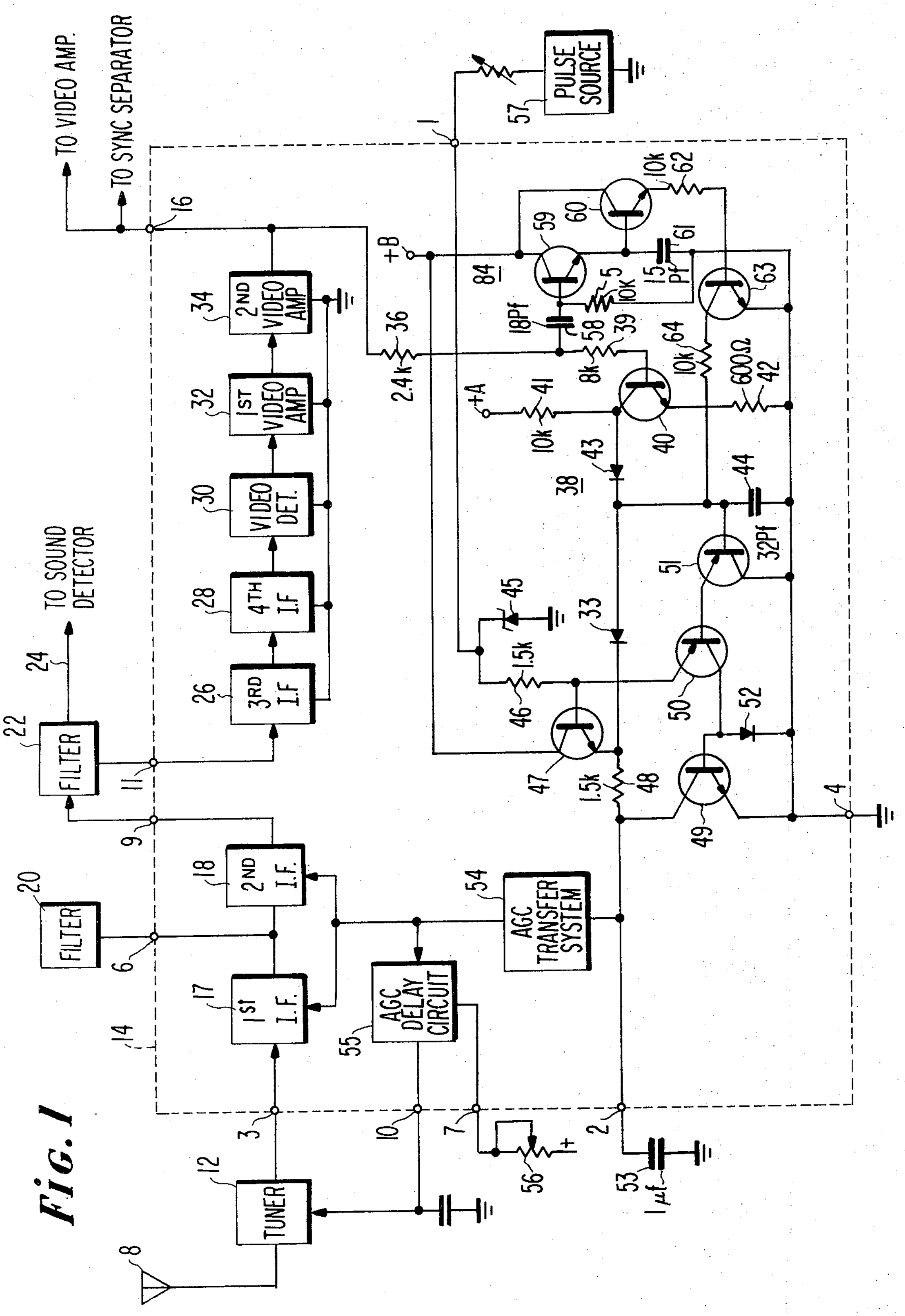
FIG. 1 is a schematic circuit diagram partially in block form of a portion of a television receiver embodying an AGC circuit constructed in accordance with the present invention.

Referring now to FIG. 1 of the drawings, the dashed rectangle 14 schematically represents a monolithic semiconductor integrated circuit chip. A plurality of contact areas or terminals are disposed about the periphery of chip 14 through which external connections to various circuits on the chip can be made. In this regard, and compatible with present day technology and design philosophy, there may be included on the chip 14 a video signal processing channel which includes first and second intermediate frequency amplifiers 17 and 18, third and fourth intermediate frequency amplifiers 26 and 28, a video detector 30, a first video amplifier 32 and a second video amplifier 34.

In a television receiver employing a chip 14, a modulated carrier wave television signal is intercepted by an antenna 8 and is coupled to a tuner 12. The tuner 12 may include, as is known, a radio frequency (RF) amplifier and a frequency converter for converting the received radio frequency signal to an intermediate frequency signal. The intermediate frequency signal derived from the tuner 12 is coupled through terminal 3 of chip 14 to first intermediate frequency (IF) amplifier 17. Signals from first IF amplifier 17 are developed across a tuned filter 20, coupled external to the chip 14 at terminal 6, and are then coupled to second IF amplifier 18. Amplified intermediate frequency signals are coupled through terminal 9 and a second external frequency selective filter network 22 to a sound detector (not shown). Signals from frequency selective filter network 22 are coupled to third and fourth directly coupled IF amplifiers 26 and 28 through terminal 11.

The amplified intermediate frequency output of the fourth IF amplifier 28 is applied to a video detector stage 30. The signal output of the detector 30 is amplified in a first video amplifier 32 and is then coupled to a second video amplifier 34. The output of second video amplifier 34 is coupled by way of terminal 16 to other amplifiers (not shown) external of chip 14 for further amplification of the video signal prior to its being applied to the appropriate control electrodes of a cathode ray tube for display. The second video amplifier 34 also supplies signals for sync separator circuits of the receiver (not shown) located external to chip 14.

Referring to the schematic portion of FIG. 1, a keyed AGC circuit generally shown as 38 is included within integrated circuit chip 14. The circuit 38 includes means for supplying synchronizing signal components of the video signal from the output of second video amplifier 34. To this end, resistors 39 and 36 are coupled from amplifier 34 to a signal amplitude sensitive circuit comprising a transistor 40. A resistor 41 is coupled between the collector of transistor 40 and a source of positive voltage supply (+A) of, for example, six volts. The emitter of transistor 40 is coupled to a point of reference potential or ground through resistor 42, and the base thereof is coupled to resistor 39. Transistor 40 is operative such that when the voltage appearing at the base thereof falls below a threshold level of approximately one volt, transistor 40 operates as an amplifier. For all voltages above the threshold level of approximately one volt, transistor 40 operates as a switch and is maintained in a saturated condition.

A first charging circuit comprising the series combination of resistor 41, a diode 43 and a capacitor 44 is coupled to the voltage supply (+A). The time constant of this charging circuit is short relative to the widths of any of the synchronizing pulses (including horizontal, vertical and equalizing pulses). The junction of resistor 41 and diode 43 is direct coupled to the collector of transistor 40. Capacitor 44 and diode 43 form a peak detector circuit for detecting the voltage at the collector of transistor 40.

A keying means for supplying recurrent flyback voltage pulses derived, for example, from a transformer associated with the receiver horizontal deflection circuit (not shown) comprises a pulse source 57. Included in the keying means is a transistor 47 having a base coupled to the pulse source 57 through a resistor 46 and chip terminal 1. A zener diode 45 (e.g., a 6 ½ – 7 ½ volt zener) is also coupled between terminal 1 and ground. The keying means further comprises PNP transistors 50 and 51. The emitter of transistor 50 is coupled to the base of transistor 47 and the base of transistor 50 is coupled to the emitter of transistor 51. The base of transistor 51 is coupled to a common terminal of diode 43 and capacitor 44 and the collector thereof is coupled to a source of reference potential or ground. A diode 52 is also included in the keying means and is coupled from the collector of transistor 50 to ground. An output filter circuit means comprising a capacitor 53 is coupled to the emitter of transistor 47 through a resistor 48 and chip terminal 2. The time constant of the output filter circuit means is long relative to the time constant of the peak detecting circuit 40, 41, 42, 43, 44. A discharging means comprising diode 33 and the resistor 48 are direct coupled in series between the output filter capacitor 53 and capacitor 44. A current draining means comprising transistor 49 is coupled to the common terminal of resistor 48 and capacitor 53. Transistor 49 includes a collector coupled to the common terminal of capacitor 53 and resistor 48, an emitter coupled to ground, and a base coupled to the common terminal of diode 52 and the collector of transistor 50.

A first impulse noise protection circuit generally represented as 84 is coupled to the AGC circuit 38. A capacitor 58 is coupled between the common terminal of resistors 36 and 39 and the base of a transistor 59. Resistor 5 is coupled from ground to the common terminal of capacitor 58 and the base of transistor 59. The collector of transistor 59 is coupled to a positive voltage supply (+B) of, for example, eleven volts. The emitter of transistor 59 is coupled to the base of a transistor 60, the collector of which is also coupled to the supply (+B). The emitter of transistor 60 is coupled through a resistor 62 to the base of a transistor 63. A capacitor 61 is coupled between the base of transistor 60 and a source of reference potential or ground. The emitter of transistor 63 is coupled to ground and the collector of transistor 63 is coupled through a resistor 64 to the common terminal of diode 43 and capacitor 44 (i.e., to the base of transistor 51).

The output of AGC circuit 38 is developed at terminal 2 of integrated circuit chip 14. An AGC transfer system 54 is also coupled to terminal 2 and provides an AGC voltage to control the gain of the first and second IF amplifier 17 and 18. The AGC transfer system 54 also supplies a voltage to AGC delay circuit 55 which operates to provide a delayed AGC signal to the tuner 12 and to affect its gain when the received signal has reached a predetermined level determined by a variable resistor 56 coupled to integrated chip 14 at terminal 7. The AGC delay circuit 55 is coupled to tuner 12 by way of terminal 10 of integrated chip 14.

The AGC circuit described above provides charging current to AGC capacitor 53 to increase the gain control voltage when the gain of the R-F and I-F signal amplifying chain is to be reduced. An AGC circuit embodying my invention for use in a system where the AGC capacitor is discharged (i.e., control voltage is decreased) to decrease the system signal gain will be described in conjunction with FIGS. 3A, 3B and 3C below.

Circuit 38 of FIG. 1 has two general modes of operation. The first mode of operation or the in-sync mode, occurs when keying pulses are present at terminal 1 in time coincidence with the sync tips of the video information coupled into the base of transistor 40. The second mode of operation, or the out-of-lock mode, occurs when the keying pulses at terminal 1 are not in time coincidence with the synchronizing pulses of the video information at the base of transistor 40. Circuit 38 responds differently in each mode of operation and for the in-sync and out-of-lock modes, circuit 38 has separate responses for noise protection.

Figure 2:
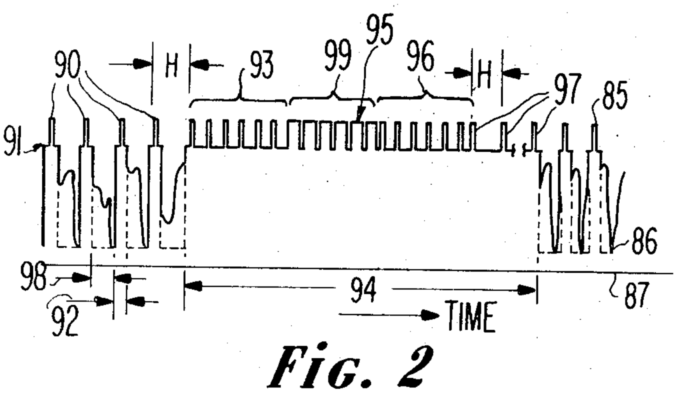
FIG. 2 is a representation of a composite video signal.

Referring to FIG. 2, an illustrative composite video signal supplied from second video amplifier 34 and appearing at the base of transistor 40 is shown with the most positive portion closest to horizontal line 87. A monochrome signal is shown for purposes of simplification. However, it should be recognized that the system is equally suitable for a color video signal including burst components. The indicated voltage levels 85, 86 and 87, typical values for which are indicated below, exist for the condition of proper gain in the R-F and I-F signal amplifier chain. Starting from the left-hand side of the illustrated signal waveform, four horizontal synchronizing pulses 90, each having a width of about 5 microseconds are shown, and as is well known, they extend above black level 91. A horizontal blanking interval 92 is associated with each of these pulses. The varying signal occurring between the blanking intervals comprises the information or video components of the signal (the time scale is compressed during the video portions to facilitate illustration of the remainder of the waveform). Immediately following the last of these four horizontal synchronizing pulses, the video signal returns to the black level in preparation for vertical retrace. The vertical blanking interval 94 begins with six equalizing pulses 93, each having a width of 2 ½ microseconds and recurring at twice the horizontal line rate. These equalizing pulses are required to provide exact timing of vertical retrace and successive fields. Serrated vertical synchronizing pulses 95 follow the equalizing pulses. The total duration 99 of the vertical sync pulses is three horizontal lines or about 190 microseconds, with the width of each vertical sync pulse being on the order of approximately 30 microseconds. Each of the serrations (the positive-going or downward extending portions in FIG. 2) between the vertical sync pulses is on the order of 2 ½ microseconds in duration. Another series of equalizing pulses 96 is then supplied, followed by a number of 5 microsecond duration horizontal synchronizing pulses 97 which continue to appear until the completion of vertical blanking 94. After the end of the vertical blanking interval, active scanning is resumed and the composite signal, including the information or video components, and blanking and synchronizing pulses for each active horizontal line continues for another field. It is important to note that three distinct synchronizing pulse widths are present in the video signal, namely the 5 microsecond horizontal synchronizing pulses, the 2 ½ microsecond equalizing pulses and finally the 30 microsecond serrated vertical synchronizing pulses. Typical signal voltage values that appear at the base of transistor 40 include the synchronizing pulse tips 85 at a value during normal operation of approximately +0.8 volts D.C. above ground potential. White level 86 will have a value fo approximately +7 volts above ground potential, and a signal corresponding to zero carrier level 87 will be at approximately +8 volts above ground potential.

Referring back to the circuit 38 of FIG. 1, the signal applied to the base of transistor 40 during the in-sync mode of operation can fall within three different voltage regions, those regions representing three different conditions of the overall system signal gain. When the sync tips at the base of transistor 40 are at a voltage greater than approximately one volt above ground potential, the signal gain of the R-F and I-F systems is considered to be too low, i.e., the video voltage excursions appearing at terminal 16 are considered to be below the effective operating range of the sync separator and the video amplifier. When the sync tips at the base of transistor 40 are at a voltage approximately between one volt and .7 volts above ground potential, the video information at terminal 16 is considered to be in a normal condition. When the sync tips at the base of transistor 40 fall below 0.7 volts above ground, the signal gain of R-F and I-F systems is considered to be large.

During the in-sync mode, if the signal gain is too low, the voltage at the base of transistor 40 will be greater than one volt and transistor 40 remains in a saturated condition. The collector of transistor 40 is therefore near ground potential. A keying pulse is applied to the base of transistor 47 from pulse source 57 during each horizontal retrace interval and operates to supply a current via resistor 46 to the common terminal of the base of transistor 47 and the emitter of transistor 50. Since transistor 40 is saturated, substantially no voltage appears across capacitor 44. The base of transistor 51 is substantially at ground potential and, therefore, transistors 50 and 51 are biased in a highly conductive state and draw maximum current (i.e., emitter current of transistor 50 is substantially equal to the total current supplied via resistor 46). Transistor 47 therefore effectively is turned off and no charging current is supplied to AGC capacitor 53. The collector current of transistor 50 is coupled to diode 52 which, in combination with transistor 49 acts as current amplifier having a gain determined by the relative areas of the devices 49, 52 as is known. Where the two devices are of like geometry, the collector current of transistor 49 is substantially equal to the current in diode 52. Diode 33 is reverse biased due to the voltage drops across the base emitter junctions of transistors 51, 50 and 47. Therefore, transistor 49 is operative to discharge capacitor 53. When the voltage across capacitor 53 decreases, a resultant increase in I-F (and/or R-F) signal gain will occur to correct the improper signal condition appearing at terminal 16. Under these conditions, a constant draining current of approximately 500 microamps is applied to capacitor 53 by transistor 49 during each synchronizing interval. Pulse source 57 has been chosen to supply a constant current of at least 500 microamps. Therefore, transistor 49 will drain charge from capacitor 53 during each keying period independent of the voltage across capacitor 44 since a constant current into the emitter of transistor 50 will be mirrored in the emitter transistor 49. Thus, transistor 49 will provide such a drain current during each keying pulse interval, even under correct RF and IF gain conditions and charging current will be supplied by transistor 47 equal to the draining current to maintain the charge on capacitor 53. When the voltage at capacitor 53 is drained to approximately $2V_{BE}$, the minimum threshold voltage necessary for activating the AGC transfer system 54 is reached and the system operates under maximum signal gain conditions.

If the overall signal gain of the system (I-F and R-F amplifiers) is correct, the voltage excursions of the sync tips at the base of transistor 40 will extend below one volt and transistor 40 is brought out of saturation during the occurrence of each sync pulse. Transistor 40 then operates as an amplifier until the voltage at its base approaches the transistor conduction threshold of one $V_{BE}$ (approximately 0.7 volts). When transistor 40 is operating as an amplifier, the inverted sync-tip-representative voltage at the collector of transistor 40 is peak detected by diode 43 and capacitor 44. The voltage on capacitor 44 is therefore representative of the voltage excursions on the base of transistor 40 which extend below the threshold level of approximately one volt. The peak-detected voltage across capacitor 44 is held for the full keying pulse interval since, as explained earlier, diode 33 is reverse biased during the presence of the keying pulse and transistor 51 exhibits a large input impedance. The base current of transistor 51 also is coupled to capacitor 44 and is in a direction to compensate for any leakage current of capacitor 44, thereby maintaining an approximately constant voltage across the capacitor during the full keying pulse interval. The charging time constant for capacitor 44 is selected such that it is small compared to the time interval of the shortest synchronizing pulse (the equalizing pulse). In this embodiment of the invention, the charging time constant for capacitor 44 is less than 178 microsecond. As described above, under correct AGC conditions, transistor 47 is forward biased supplying charging current equal to the draining current drawn by transistor 49 to maintain the charge on capacitor 53.

At the end of the keying pulse interval, transistors 47, 50 and 51 are no longer on. Diode 33 becomes forward biased and the charge on capacitor 44 quickly discharges through diode 33 and resistor 48 into capacitor 53 thereby resetting the peak detector circuit. The discharging time of capacitor 44 is relatively small and has little effect upon the RF and IF (overall) gain.

When the voltage excursions of the sync tips at the base of transistor 40 are less than the conduction threshold of transistor 40, i.e., too much RF and IF gain, the voltage excursions fall below $V_{BE}$. Transistor 40 is turned off and capacitor 44 charges towards the voltage of the supply (A+). When the voltage at the bases of transistors 51 and 50 are at their maximum positive potential, transistor 47 supplies its maximum amount of current, approximately 2 milliamperes. Capacitor 53 charges positively towards its maximum voltage, i.e., approximately 5 volts so as to reduce system signal gain. Again, when the keying pulse ends, resetting occurs when capacitor 44 discharges through diode 33 and resistor 48 into capacitor 53.

The AGC circuit 38 just described has what is commonly referred to as a sample and hold characteristic. Capacitor 44 will sample the voltage excursions at the base of transistor 40 which fall within a predetermined range and holds such sample during the horizontal keying pulse interval. Normally, during the in-sync mode of operation, the voltage that is sampled when the keying pulse is present is the voltage representative of the sync tip excursions. Any voltage sampled when no keying pulse is present will not produce charging or discharging currents from transistors 47 and 49 respectively due to the absence of the keying pulse current. But a constant charging current will be supplied through resistor 41, diodes 43 and 33 and resistor 48 to capacitor 53 to prevent stripping of the sync pulses. The stretching or holding of the sample period allows for lower peak currents into AGC capacitor 53 which reduces the ripple or "glitch" effect appearing on the video signal when the AGC voltage is fed back to the IF amplifiers 17 and 18 of FIG. 1.

Since the time duration of the charging current in transistor 47 is a function of the horizontal keying pulse duration, the AGC charge put on capacitor 53 is independent of the pulse width of the input sync pulses at the base of transistor 40. Also, since the keying pulse lasts for approximately 15 microseconds, the time duration of the AGC is increased by about 3 times for the five microsecond duration horizontal sync pulses. The AGC current can now be reducd by about 3 times to maintain the same AGC gain, thereby resulting in an improved transient response of the system. Vertical depression is thereby reduced since the shorter (2 ½ microsecond) equalizing pulses are "stretched," i.e., the AGC charge is dependent only upon the excursions of the pulses beyond the threshold of transistor 40, not their width. With the reduction in vertical depression, the speed of the AGC circuit can be increased by proper selection of capacitor 53, thereby allowing the AGC to quickly adjust when there are rapid changes in the level of the received signal at the antenna. This increased AGC speed will reduce the effects of airplane flutter caused by reflections from passing airplanes and reduce fading when the tuned channel is changed from a strong incoming signal to a weak incoming signal and vice versa.

Another advantage of the circuit just described while operating in the in-sync mode, is that during the presence of impulse noise, the gain will not decrease by a substantial amount. Since impulse noise extending beyond the black level has the same effect as a sync pulse on transistor 40. If such noise occurred during the keying pulse supplied by source 57, it could effect a decrease in RF and IF gain. This in effect, is a false gain reduction. In order to prevent this undesirable operating condition, a noise circuit, generally shown as 84, is coupled to the source of video signals applied to the base of transistor 40. The noise circuit acts to discharge capacitor 44 and avoid a decrease in RF and IF gain that is caused when transistor 40 is pulled out of saturation by the noise signals. The operation of a noise sensing circuit similar to that portion of the circuit used herein is described in m U.S. Pat. No. 3,634,620 and entitled "NOISE PROTECTED AGC CIRCUIT WITH AMPLITUDE CONTROL OF FLYBACK PULSES."

Where my patented noise protection circuit operated to reduce the amount of flyback current being supplied to an AGC circuit in the presence of noise, the embodiment of the noise circuit used herein operates to reduce the value of the sampled voltage across capacitor 44 so to prevent a false AGC signal and to prevent peak detection thereat at capacitor 44. Noise circuit 84 operates as follows. Capacitor 58 in conjunction with resistor 5 differentiates signals supplied to capacitor 58. The positive going edge of noise appearing at the base of transistor 40 will be peak detected by transistor 59 and capacitor 61. The charging time constant for capacitor 61 is relatively short compared to the charging time constant associated with capacitor 53. The discharging time constant for capacitor 61 is relatively long compared to its charging time constant. Therefore, transistor 59 will supply large charging currents in the presence of a noise pulse but the charging current will be of a short duration while capacitor 61 will hold the charge supplied by each pulse for a longer duration of time. The peak detected voltage across capacitor 61 is applied to the base of transistor 60, turning transistor 60 on and causing current to flow into the base of transistor 63. Transistor 63 will saturate when transistor 60 is turned on and will remain in saturation for a period determined by the discharge time of capacitor 61. When transistor 63 is saturated, capacitor 44 is discharged through resistor 64 and transistor 63 thus cancelling the noise at capacitor 44.

When the keying pulse is present, capacitor 44 will be capable of charging to a voltage represented by the divider voltage between resistor 41 and resistor 64, but will not hold the charge. The divider voltage is selected to provide enough AGC to insure AGC "lock-out," but not enough AGC to cause "set-up" in the presence of impulse noise. This effectively acts to reduce the false AGC voltage across capacitor 44. Once the impulse noise is gone, capacitor 61 will continue to keep transistor 60 turned on for a time determined by the amount of noise previously present due to the long (relative to the noise pulses) discharging time constant of capacitor 61. Once transistor 63 comes out of saturation, capacitor 44 reverts back to its normal operating condition. The noise circuit 84 therefore prevents the AGC circuit from reacting to the impulse noise, thereby preventing a false AGC voltage at terminal 2. Should noise occur during the period between sampling, i.e., when the keying pulse is not present, capacitor 44 charges to the divider voltage between resistors 41 and 64. In the presence of a series of noise pulses, capacitor 44 will remain at this divider voltage, thereby not reacting to each noise pulse individually but providing a selected lower gain AGc action during such series of noise pulses. The slow discharge time of capacitor 61 is operative to prevent successively quick changes in the voltage across capacitor 44 thereby maintaining a relatively constant AGC voltage at terminal 2 during keying in the presence of impulse noise.

Circuit 38 also operates to provide noise protection and AGC voltage during the second mode or the out-of-lock mode (i.e., when the keying pulse and the synchronizing pulses are not in time coincidence). In this out-of-lock mode, when the RF and IF gain is too low, the voltage excursions at the base of transistor 40 will be greater than one volt substantially at all times (except during possible large noise pulses). Thus, when a keying pulse is present, the base of transistor 51 will be at ground potential and a constant drain current will be drawn by transistor 49. Capacitor 53 will therefore be discharging towards the minimal threshold voltage of approximately $2V_{BE}$ which acts to increase the gain of the I-F and/or R-F amplifiers. Once the keying pulse is absent, transistor 49 is no longer drawing current and no change in AGC voltage is produced.

During the out-of-lock mode, when video signal excursions at the base of transistor 40 fall below $V_{BE}$ (i.e., too much RF and IF gain), they are detected across capacitor 44 as described earlier. When the keying pulse is supplied by source 57 AGC current will be supplied by transistor 47, thereby decreasing the overall gain of the system. When the keying pulse is absent, capacitor 44 will discharge through diode 33, resistor 48 and capacitor 53. This discharge time is very short in comparison with the discharge time of capacitor 53. If, between keying pulses, the voltage excursions at the base of transistor 40 are less than $V_{BE}$, a charging current may be supplied to capacitor 53 through resistor 41, diodes 43 and 33 and resistor 48 to reduce the RF and IF gain.

During the out-of-lock mode, the above-described circuit is additionally protected from impulse noise pulses. When the keying pulse is present, if transistor 40 is pulled out of saturation by the noise, noise protection circuit 84 will operate to prevent capacitor 44 from charging to voltage supply A+ as described above. Rather, capacitor 44 will be pulled down to a voltage determined by resistors 41 and 64 tending to cause capacitor 53 to assume a like voltage. In the absence of the keying pulse, if transistor 40 is turned off by the noise, a second charging path comprising resistor 41, diodes 43 and 33 and resistor 48 is coupled to capacitor 53. This charging path will tend to provide a current to decrease the gain. This second charging path also forms a low gain non-keyed AGC system to reduce the AGC beat that is produced when the out-of-lock mode occurs. Stripping of the sync pulses during the out-of-lock condition is prevented by the charging current produced when diode 33 is forward biased and transistor 40 is off. The current available for the non-keyed AGC charging time is small, being limited by resistor 41 and 48 in series with diodes 43 and 33. This component of AGC is not "stretched," since capacitor 44 is rapidly discharged through diode 33 and resistor 48.

The operation of the above-described circuit during the out-of-lock mode in the presence of noise also prevents "stripping" of the sync pulses when a false AGC signal is sampled by capacitor 44. The above-described circuit is therefore protected against noise during the in-sync mode and during the out-of-lock or out-of-sync mode.

In the above-described circuit embodying my invention, transistor 49 serves to discharge capacitor 53 in a controlled manner. The amount of current drained is dependent upon the amplitude of the keying current supplied to terminal 1 then through transistor 50 and diode 52. Since the response time of the AGC system is dependent upon the charging and discharging time constants of the AGC capacitor 53, the AGC circuit of FIG. 1 is arranged to both increase and decrease the RF and IF gain at variable rates determined by the relative level of the video signal with respect to the predetermined reference level. In many prior AGC systems where a resistor is coupled across the AGC filter capacitor, a fixed comparatively slow time constant exists for discharging the capacitor. Because there is a current drain through this resistor during each horizontal period, a "tilt" is produced in the video signal from white to balck across the television screen when the video signal is operating in the normal mode. In this embodiment of my invention, since the drain resistor is not employed, the change in AGC voltage during a horizontal period in the video information has been reduced, while increasing the basic speed of the AGC system to changes such as airplane flutter.

Figure 3A:
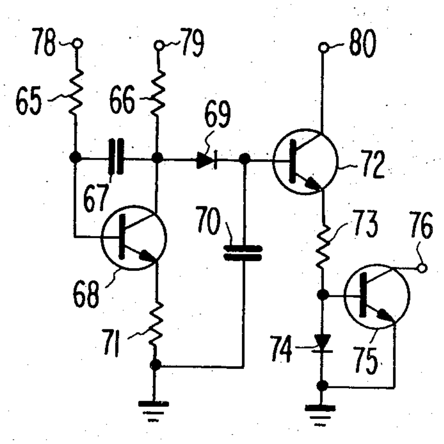
FIGS. 3A, 3B and 3C are circuit diagrams of alternative embodiments of various aspects of the invention.
Figure 3B:
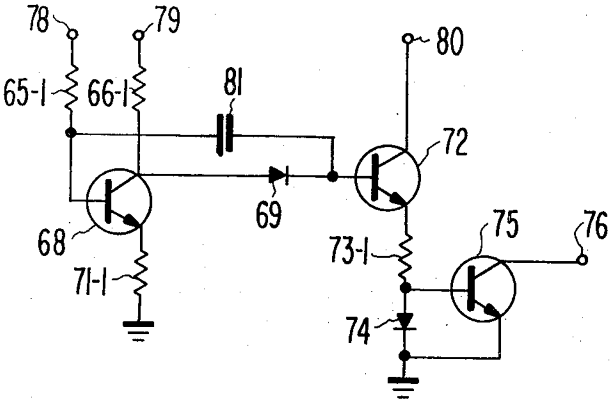
Figure 3C:
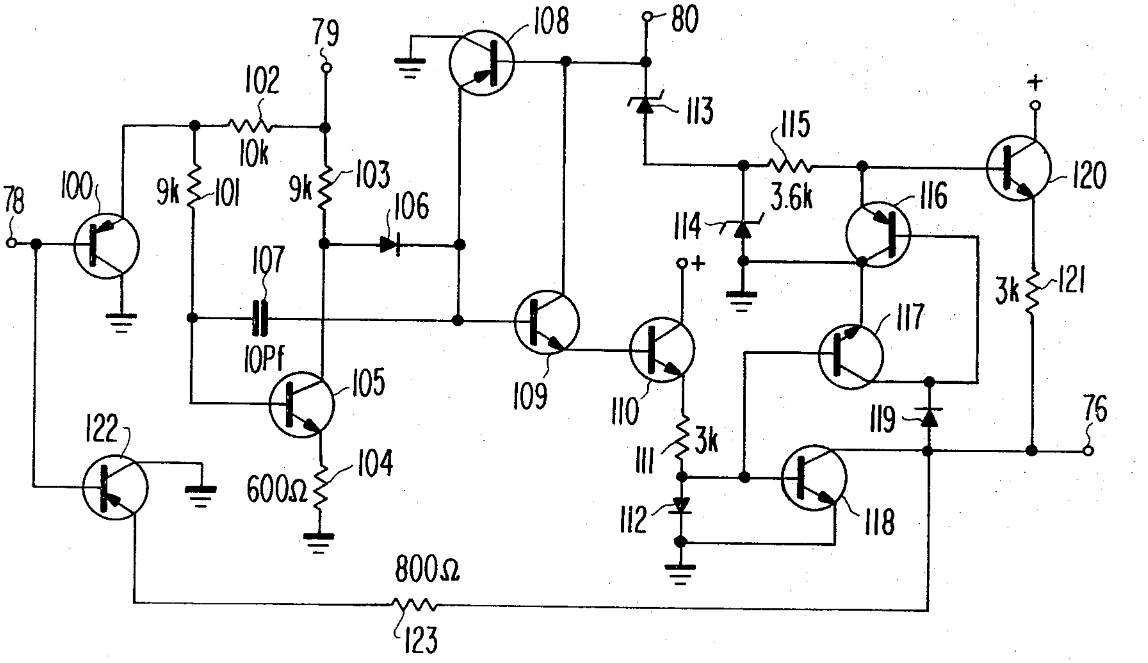

FIGS. 3A, 3B and 3C are diagrams of circuits embodying the invention for use in an AGC system where the AGC capacitor is discharged when the video signal is too large. The resultant decrease in AGC voltage results in a decrease in RF and IF gain.

Referring to FIG. 3A, negative-going video signals of the type produced by second video amplifier 34 of FIG. 1, are coupled at terminal 78 through resistor 65 to the base of transistor 68. Transistor 68 serves the function, similar to transistor 40 of FIG. 1, of a threshold sensing device. The collector of transistor 68 is coupled to a voltage supply terminal 79 through resistor 66 while the emitter thereof is coupled to a source of reference potential (ground) through resistor 71. Capacitor 67 is coupled between the base and collector of transistor 68. Diode 69 is coupled between the collector of transistor 68 and the base of transistor 72. Capacitor 70 is coupled between the base of transistor 72 and ground. Diode 69 and capacitor 70 act in a similar manner as diode 43 and capacitor 44 of FIG. 1 as a peak detector. The collector of transistor 72 is coupled to a source of keying pulses through terminal 80. Transistor 72 has a similar function as transistors 51 and 50 of FIG. 1. The emitter of transistor 72 is coupled through resistor 73 and diode 74 to ground. Diode 74 performs a similar function in this circuit as diode 33 of FIG. 1, for discharging capacitor 70 at the end of a keying period and also acts as a current translator in combination with transistor 75. The base of transistor 75 is coupled to the junction between diode 74 and resistor 73. The emitter of transistor 75 is coupled to ground while the collector of transistor 75 is coupled to output terminal 76 for further coupling to an AGC capacitor (not shown). Transistor 75 performs a similar function in this circuit as transistor 47 of FIG. 1, for controlling the voltage across the AGC capacitor.

Operation of the circuit may be described as follows. Resistor 65 and capacitor 67 form a low pass filter to restrict the bandwidth of the AGC system for thermal and impulse noise performance, since thermal and impulse noise are of a higher frequency than the sync pulses of the video. When the input sync pulse signals at the base of transistor 68 fall below a chosen threshold value, transistor 68 comes out of saturation and diode 69 and capacitor 70 peak detect the amplitude of the sync signal. Transistor 72, resistor 73, diode 74 and transistor 75 form voltages to current translator and current amplifier. Capacitor 70 holds the peak detected signal, since only the base current of transistor 72 will discharge capacitor 70. When the horizontal keying pulse is present at the collector of transistor 72, this peak detected signal is translated into an output current through the emitter of transistor 72, resistor 73 and diode 74. The current in the collector of transistor 75 will be approximately the same as the current flowing from the emitter of transistor 72. Therefore, a discharging current determined by the peak signal across capacitor 70 will be flowing into the collector of transistor 75 from terminal 76. This discharging current will tend to reduce the voltage across the AGC capacitor (not shown). The greater the peak detected signal on capacitor 70, the greater the discharging current in the collector of transistor 75, thereby operating to reduce the gain of the RF and IF amplifiers.

When the keying pulses are absent from the collector of transistor 72, the charge on capacitor 70 is rapidly removed through the forward biased base-emitter junction of transistor 72, resistor 73 and diode 74 to ground. The AGC discharging current is then terminated. Normally, the circuit described above has terminal 76 also coupled to a voltage supply including, for example, a resistive divider network such that in the absence of AGC discharging current, the AGC capacitor will charge up to the divider voltage, thereby tending to increase the RF and IF gain.

Since the time duration of the discharging current in transistor 75 is a function of a horizontal keying pulse duration, the AGC discharging current is independent of the pulse width of the input sync pulses at terminal 78. Therefore, the above-described circuit has a similar sample and hold characteristic of circuit 38 of FIG. 1.

The circuit shown in FIG. 3B is similar to the circuit shown in FIG. 3A, except the capacitor 81 replaces capacitors 67 and 70 of FIG. 3A. Resistors 65, 66, 71 and 73 need only be replaced with the appropriate values to provide the appropriate time constant and base current for transistor 72. Operation of this dual function capacitor 81 is described in conjunction with the circuit of FIG. 3C.

FIG. 3C also shows a circuit diagram embodying the invention for use in an AGC circuit where decreasing AGC voltage produces a decrease in gain. Negative-going video information is coupled at terminal 78 to the base of a level-shafting transistor 100. The emitter thereof is coupled through resistor 102 to a positive voltage supply terminal 79. The base of a threshold sensing transistor 105 is coupled to the emitter of transistor 100 through resistor 101. Transistor 105 serves a similar function as transistor 40 of FIG. 1. A diode 106 and a capacitor 107 are coupled between collector and base of transistor 105 and form a peak detector similar to diode 43 and capacitor 44 of FIG. 1. The collector of transistor 108 is coupled to ground and the base is coupled to the collector of transistor 109. The emitter of transistor 109 is coupled to the base of transistor 110. The collector of transistor 110 is coupled to a source of voltage supply (+) and the emitter is coupled through resistor 111 and diode 112 to ground. Transistors 108, 109 and 110 operate in a similar manner as transistors 51 and 50 of FIG. 1. Resistor 111, diode 112 and the base-emitter junction of transistor 118 operate in a similar manner as transistor 47 and resistor 48 of FIG. 1. The common terminal between diode 112 and resistor 111 is coupled to the bases of transistors 118 and 117. The emitter of transistor 117 is coupled to ground and the collector of transistor 117 is coupled to an AGC capacitor (not shown) through terminal 76. The collector of transistor 118 is coupled through diode 119 to the collector of transistor 117. Transistor 118 operates in a similar manner as transistor 47 of FIG. 1 where the latter supplies charging current and the former supplies discharging current for the AGC capacitor relative to the voltage across their respective peak detector capacitors. The base of transistor 116 is coupled to the collector of transistor 117 and the collector thereof is coupled to ground. The emitter of transistor 116 is coupled through resistor 115 to zener diode 114. Zener diode 114 is coupled between zener diode 113 and ground. Zener diode 113 is coupled to terminal 80. Coupled to terminal 80 is a source of recurrent keying pulses. The base of transistor 120 is coupled to the emitter of transistor 116. The collector of transistor 120 is coupled to a source of positive voltage supply and the emitter thereof is coupled through resistor 121 to terminal 76. Zener diode 114, resistor 115, transistor 120 and resistor 121 operate in a similar manner as transistor 49 of FIG. 1 for supplying an AGC charging current when video is being sampled during a keying pulse interval.

Transistor 122 and resistor 123 are coupled between terminal 78 and terminal 76. The base of transistor 122 is coupled to terminal 78, the collector thereof is coupled to ground. Transistor 122 and resistor 123 provide a predetermined AGC charging current during the out-of-lock mode similar in operation to resistor 41, diodes 43 and 33 and resistor 48 of FIG. 1.

Operation of the circuit shown in FIG. 3C may be described as follows. The negative-going video signal is applied to input terminal 78. Transistor 100 is a D.C. level shifter which couples the video signal to the base of transistor 105 when transistor 100 is turned on. Resistor 101 and capacitor 107 form an input filter which restricts the bandwidth of the video signal coupled to terminal 78. Transistor 105 is biased such that, in the presence of a negative-going signal having an amplitude less than a chosen positive threshold value, transistor 105 will come out of saturation. Diode 106 and capacitor 107 peak detect the voltage at the collector of transistor 105 when transistor 105 is out of saturation. Thus, when system gain is either too great or approximately correct, signal excursions at the base of transistor 105 cause transistor 105 to come out of saturation, allowing capacitor 107 to charge through diode 106 to a voltage representative of the minimum (least positive) voltage excursion of the signal. Normally, during the in-sync mode, the least positive signals appearing at the base of transistor 105 are the horizontal sync pulses and are in time coincidence with the keying pulses supplied at terminal 80. In the presence of this keying current, transistor 108 is turned off and the voltage on capacitor 107 will determine the base current of transistor 109. The current allowed to flow in transistor 109 is such that the base current drain of transistor 109 is minimal, thereby keeping an approximately constant charge on capacitor 107. Once the keying current is gone, capacitor 107 quickly discharges through transistor 108 which is turned on in the absence of a keying pulse. The charging time constant of capacitor 107 is of the order of 0.5 microseconds. The charging time constant of capacitor 107 is chosen to be less than the pulse width of the shortest pulse present during the vertical retrace period of the video signal. Transistors 109 and 110 translate the peak detected signal on capacitor 107 to resistor 111 and to diode 112. Transistor 118 provides a resultant discharging current for the AGC capacitor (not shown) coupled to the collector of transistor 118 at terminal 76. When transistor 117 is saturated, which occurs when there is too much RF and IF gain and transistor 105 is turned off, transistor 116 conducts, thereby turning off transistor 120. When transistor 118 is conducting, transistor 117 is conducting, allowing discharging current to be provided for the AGC capacitor at terminal 76 to decrease the AGC voltage, thereby decreasing the RF and IF gain.

When a keying pulse is present and the signal excursions at the base of transistor 105 are too small to take transistor 105 out of saturation, i.e., either the horizontal sync voltage excursions are too small or the sampling occurs during the video portion of the horizontal period, transistor 120 has its base clamped to the voltage across zener diode 114. In this embodiment, the zener diode voltage is chosen as approximately 5.5 volts. A predetermined charging current then will flow through resistor 121 to terminal 76, thereby increasing the charge on the AGC capacitor, providing an increase in RF and IF gain.

When a video sync pulse voltage excursion has an amplitude which causes transistor 105 to come out of saturation (i.e., the correct RF and IF gain or too much gain) the sync pulse voltage excursion will be peak detected and held during the full horizontal keying interval. This effectively "stretches" the width of the synchronizing and equalizing pulses to the full keying pulse interval.

Transistors 109, 110 are similar in operation to transistors 50 and 51 of FIG. 1 in that the amount of discharging current supplied by transistor 118 in the former is determined by the peak detected voltage applied to the base of transistor 109, while in the latter, the amount of charging current supplied by transistor 47 is determined by the peak detected voltage supplied to the base of transistor 51.

When the system of FIG. 3C is out of horizontal lock, i.e., a keying pulse appears at terminal 80 and there is no synchronizing pulse appearing at terminal 78, transistor 122 and resistor 123 are provided to form a low gain simple AGC system to reduce the AGC beat that is produced when this out of horizontal lock mode occurs. When there is a horizontal sync pulse present to cause transistor 122 to conduct and there is no keying pulse present, transistor 122 will tend to reduce the voltage on the AGC capacitor normally connected to terminal 76, to offset the increase in AGC voltage due to transistor 120 and resistor 121, which conduct during the keying interval in the out-of-sync condition.

Various other modifications may also be made within the scope of the broad aspects of the invention. For example, by returning the collector of transistor 50 of FIG. 1 directly to ground, the capacitor 53 can be discharged by coupling a resistance across it in place of the transistor-diode combination of transistor 49 and diode 52. Also, different noise protection circuits can be utilized in place of noise protection circuit 84 of FIG. 1. Other modifications will also occur to persons with skill in the art in light of this disclosure.

What is claimed is:

1. In an automatic gain control circuit of the type which is responsive to synchronizing signal components of a composite video signal, said synchronizing signal components comprising pulses of different time duration, the combination comprising:

a source of recurrent pulses normally in time coincidence with said synchronizing signal pulses, said recurrent pulses having a longer time duration than the shortest duration ones of said synchronizing signal pulses;

means for supplying said composite video signal including said synchronizing signal pulses;

amplitude sensitive circuit means responsive to said video signals for maintaining a first conductive condition for video signals of a first polarity with respect to a threshold level and for translating video signal excursions of opposite polarity with respect to said threshold level;

a peak detector circuit coupled to said amplitude sensitive circuit means for detecting said translated video signal excursions, said peak detector exhibiting a time constant suitable for peak detection of each of said synchronizing signal pulses of different duration;

keying means coupled to said source of recurrent pulses and to said peak detector circuit for providing, during the occurrence of said recurrent pulses, a variable current determined by the amplitude of the detected signal developed by said peak detector circuit; and output filter circuit means, coupled to said keying means for developing an automatic gain control voltage determined by said variable current developed by said keying means.

2. An automatic gain control circuit as described in claim 1, wherein the charging and discharging time constant for said peak detector circuit is less than the width of said recurrent synchronizing signal components.

3. An automatic gain control circuit as described in claim 2, including:

discharging means coupled between said peak detector circuit and said output filter circuit means for discharging said detected signal developed across said peak detector circuit when said recurrent pulses are not present.

4. An automatic gain control circuit of the type described in claim 3, wherein:

said keying means comprises current draining means coupled to said output filter circuit means for discharging said output filter circuit means, the draining current being dependent upon the detected signal developed across said peak detector circuit.

5. An automatic gain control circuit of the type described in claim 4, including:

a noise protection circuit responsive to impulse noise accompanying said video signal for providing a discharge path for said detected signal developed across said peak detector circuit in the presence of said impulse noise.

6. An automatic gain control circuit of the type described in claim 5, wherein:

said noise protection circuit comprises a unidirectional current conducting device coupled between said peak detector circuit and said output filter circuit such that in the presence of said impulse noise and when said recurrent voltage pulse is not present, charging current is supplied to said output filter circuit means.

7. An automatic gain control circuit of the type described in claim 6, wherein said keying means includes a current source responsive to the amplitude of the detected signal developed across said peak detector circuit.

8. An automatic gain control circuit as described in claim 7, wherein said current source includes first, second, and third transistors, each having base, collector, and emitter electrodes, with the base of said first transistor coupled to the emitter of the second transistor and the base of the second transistor coupled to said peak detector circuit;

the base of said third transistor being coupled to said source of recurrent pulses and to the emitter of said first transistor, emitter current of said first transistor in the presence of said recurrent pulses being determined by the voltage detected by said peak detector circuit.

9. An automatic gain control circuit as described in claim 8, wherein said current draining means includes a fourth transistor having base, collector and emitter electrodes wherein the collector of said fourth transistor is coupled to said output filter circuit; and the base of said fourth transistor is coupled to the collector of said first transistor such that collector current in said fourth transistor is determined by emitter current of said first transistor.

10. An automatic gain control circuit as described in claim 9 wherein said first and second transistors are of one type conductivity while said third and fourth transistors are of opposite type conductivity.

11. An automatic gain control circuit of the type described in claim 10 wherein said noise protection circuit includes:

fifth, sixth, and seventh transistors, each having base, collector and emitter electrodes;

a first filtering circuit for filtering said impulse noise and coupled to the base of said fifth transistor;

a first clamping circuit coupled between the emitter of said fifth transistor and the base of said sixth transistor for providing a clamping voltage to the base of said sixth transistor;

said sixth transistor biased such that in the presence of said clamping voltage, said sixth transistor is turned on;

a first resistive device coupled between the base of said seventh transistor and the emitter of said sixth transistor;

the collector of said seventh transistor coupled through a second resistive device to said peak detector circuit;

said seventh transistor operative such that when said sixth transistor is turned on, said seventh transistor provides a discharge path for the detected signal developed across said peak detector circuit.

12. A keyed automatic gain control circuit comprising:

first, second, third, fourth and fifth transistors each having base, emitter and collector electrodes;

means providing a source of video signals having recurrent synchronizing pulse components coupled to the base electrode of said first transistor, said synchronizing pulse components extending in a first polarity direction;

means providing a source of recurrent keying pulses normally in time coincidence with said recurrent synchronizing pulse components coupled to the base electrode of said second transistor, said keying pulses extending in a polarity direction opposite to that of said first polarity direction;

output circuit means for developing an automatic gain control voltage coupled to the emitter of said second transistor;

a capacitance device coupled between a point of reference potential and the base of said third transistor;

a first unidirectional current conducting device coupled between the collector of said first transistor and the base of said third transistor;

said first unidirectional current conducting device and said capacitance device forming a peak detector for detecting voltage excursions at the collector of said first transistor;

a second unidirectional current conducting device coupled between said first unidirectional current conducting device and the emitter of said second transistor;

the base of said fourth transistor coupled to the emitter of said third transistor and the collector of said fourth transistor coupled to the base of said fifth transistor;

the emitter of said fourth transistor coupled to the base of said second transistor; and a third unidirectional current conducting device coupled between the base of said fifth transistor and said point of reference potential;

the collector of said fifth transistor coupled to said output circuit means and the emitter of said fifth transistor coupled to said point of reference potential.

13. A keyed automatic gain control circuit as described in claim 12 wherein the charging and discharging time constant for said capacitance device is less than the width of said recurrent synchronizing pulse components.

14. A keyed automatic gain control circuit as described in claim 13, including:

means responsive to impulse noise accompanying said video signal coupled between said means for providing a source of video signals and said capacitance device to provide a discharging path for said capacitance device in the presence of said impulse noise.

15. An automatic gain control circuit as described in claim 14 including means for biasing said first transistor such that when voltage excursions of said synchronizing pulse components extend in said first polarity direction beyond a chosen threshold voltage, said first transistor operates to provide a voltage at its collector representative of the amplitude of the voltage excursions of said recurrent synchronizing pulse components, said collector voltage being peak detected by said capacitance device and said first unidirectional current conducting device;

said capacitance device discharging through said second unidirectional current conducting device when said keying pulse is not present.

16. A keyed automatic gain control circuit as described in claim 15 wherein the peak detected voltage across said capacitance device operates to control the current flowing in the collector of said fifth transistor.

17. A keyed automatic gain control circuit as described in claim 16 wherein said means responsive to said impulse noise includes:

sixth, seventh, and eighth transistors, each having base, collector and emitter electrodes;

a first filtering circuit for passing said impulse noise coupled to the base of said sixth transistor;

a first clamping circuit coupled between the emitter of said sixth transistor and the base of said seventh transistor for providing a clamping voltage to the base of said seventh transistor;

said seventh transistor biased such that in the presence of said clamping voltage, said seventh transistor is turned on;

a first resistive device coupled between the base of said eighth transistor and the emitter of said seventh transistor;

the collector of said eighth transistor coupled through a second resistive device to said capacitance device;

said eighth transistor operative such that when said seventh transistor is turned on, said eighth transistor provides a discharge path for charge on said capacitance device.

18. A keyed automatic gain control circuit as described in claim 17 wherein said first, second, fifth, sixth, seventh and eighth transistors are of the NPN type and said third and fourth transistors are of the PNP type.

19. A keyed automatic gain control device as described in claim 17 wherein said means for providing a source of recurrent keying pulses includes:

a third resistive device coupled to the base of the second transistor; and a fourth unidirectional current conducting device coupled between a point of reference potential and said third resistive element;

said recurrent keying pulses being coupled to the common terminal formed by said fourth unidirectional current conducting device and said third resistive device.

* * * * *

UNITED STATES PATENT OFFICE
CERTIFICATE OF CORRECTION

Patent No. 3,835,248 Dated September 10, 1974

Inventor(s) Jack Rudolph Harford

It is certified that error appears in the above-identified patent and that said Letters Patent are hereby corrected as shown below:

Column 2, line 17, portion reading "ACG" should read --AGC--;
Column 6, line 13, portion reading "fo" should read --of--;
Column 7, line 45, portion reading "178" should read --1/2--;
Column 8, line 32, portion reading "reducd" should read --reduced--;
Column 8, line 66, portion reading "m" should read --my--;
Column 9, line 54, portion reading "AGc" should read --AGC--;
Column 11, line 4, portion reading "balck" should read --black--.

Signed and sealed this 10th day of June 1975.

(SEAL)
Attest:

RUTH C. MASON
Attesting Officer

C. MARSHALL DANN
Commissioner of Patents
and Trademarks